United States Patent [19]
Roane

[11] 3,969,054
[45] July 13, 1976

[54] LENGTH SENSING SINGLE STRAND SHUTTLE CUTTER APPARATUS FOR CUTTING PROPELLANT GRAIN

[75] Inventor: Asa E. Roane, Blacksburg, Va.

[73] Assignee: The United States of America as represented by the Secretary of the Army, Washington, D.C.

[22] Filed: July 11, 1975

[21] Appl. No.: 595,192

[52] U.S. Cl. ................................ 425/142; 83/365; 83/370; 83/578; 83/639; 425/404
[51] Int. Cl.² .................. B26D 3/20; B26D 5/12; B26D 5/38
[58] Field of Search ............ 83/365, 370, 578, 639; 425/142, 404

[56] References Cited
UNITED STATES PATENTS

| | | | |
|---|---|---|---|
| 2,642,643 | 6/1953 | Montague | 83/370 X |
| 2,649,618 | 8/1953 | Rhodes et al. | 425/142 X |
| 3,484,513 | 12/1969 | Paoli | 425/142 X |

FOREIGN PATENTS OR APPLICATIONS

| | | | |
|---|---|---|---|
| 900,049 | 7/1962 | United Kingdom | 425/142 |

Primary Examiner—Frank T. Yost
Attorney, Agent, or Firm—Nathan Edelberg; A. Victor Erkkila; Max Yarmovsky

[57] ABSTRACT

A length sensing photocell has its output connected to the input of a Schmitt trigger control circuit which alternately actuates solenoid pneumatic valves which in turn cause a cylinder operated single strand shuttle cutter to repetitively cut extruded lengths of grain propellants to a substantially uniform length independent of their rate of extrusion.

5 Claims, 1 Drawing Figure

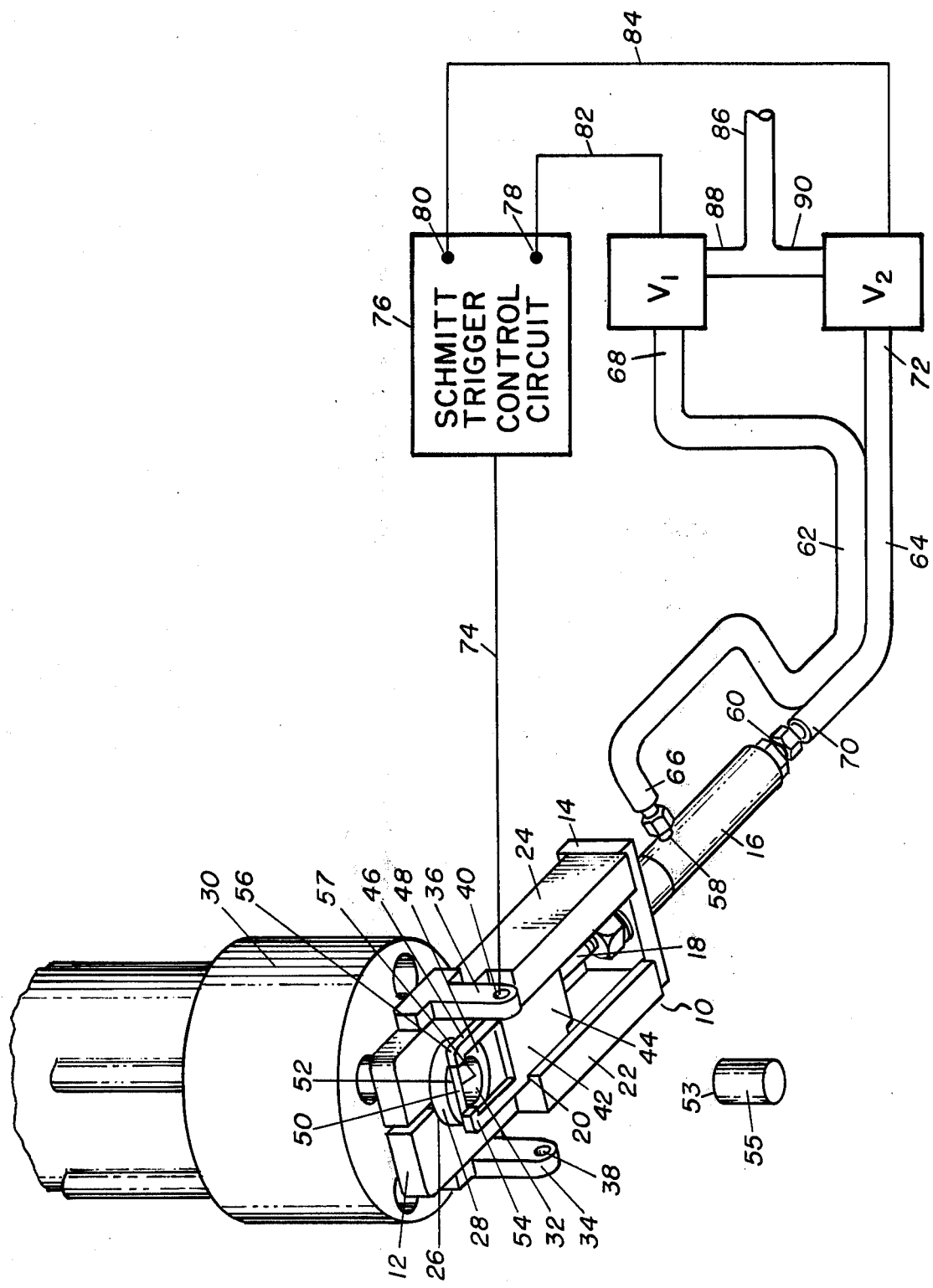

LENGTH SENSING SINGLE STRAND SHUTTLE CUTTER APPARATUS FOR CUTTING PROPELLANT GRAIN

GOVERNMENTAL INTEREST

The invention described herein may be manufactured, used and licensed by or for the Government for governmental purposes without the payment to me of any royalty thereon.

BACKGROUND OF THE INVENTION

Various means have been used in the prior art to cut continuously extruded single strands of propellant into equal lengths within close tolerances. Generally prior art cutting devices were based on an extrusion having a constant rate, or on the ability of sensing a variable rate of extrusion. In the first instance, since the rate of extrusion was rarely constant for prolonged periods of time, cutters operating on a constant extrusion rate basis were unsuccessful. In the latter case, when the attempt was made in the prior art to sense the changing rate of extrusion, problems were often encountered when the range of strand extrusion was higher than the cutter's capability of adapting to that range and thus a deficiency resulted in high grain length variability. In the past strands were also collected in batches from manually charged and operated presses. Strands collected in this fashion were often transported to other areas and then manually fed into rotating fan type cutters. This interrupted form of production is generally less efficient and does not lend itself to adaptation to a continuous automated production assembly line permitted by the present invention.

SUMMARY OF THE PRESENT INVENTION

The present invention relates to a length sensing single strand shuttle cutter that cuts off substantially uniform lengths of propellant grain from a propellant mixture which is being continuously extruded from a die holder. The interruption of a light sensing circuit by the leading edge of the extruded propellant mixture is used to generate a threshold signal of sufficient magnitude to cause a Schmitt trigger control circuit to switch from a first output signal to a second output signal and vice versa. The outputs of the Schmitt trigger are used to operate a pair of pneumatic solenoid valves which control the flow of high pressure air to and from a reciprocating type air cylinder. A double edge cutter, which is attached to the piston of the air cylinder, is positioned intermediate to the extruder die holder extruding orifice and the optical light sensing device so as to determine the cut off length of the grain size.

An object of the present invention is to provide a length sensing single strand shuttle cutter device that can cut substantially uniform lengths of continuously extruded material.

Another object of the present invention is to provide a length sensing single strand shuttle cutter device which can repetitively cut substantially uniform lengths of propellant grain from material being continuously extruded with variable rates.

Another object of the present invention is to provide a length sensing single strand shuttle cutter apparatus having electronic control circuitry for adjusting cutter response to uneven extrusion rates.

Another object of the present invention is to provide a length sensing single strand shuttle cutter which enhances the feasibility of cutting propellant grains in a continuous automated system.

A further object of the present invention is to provide a length sensing single strand shuttle cutter, for the production of uniform length propellant grain, which is more efficient than the production of grain propellants from the batch collection of strands from manually charged and operated presses.

For a better understanding of the present invention, together with other and further objects thereof, reference is made to the following descriptions taken in connection with the accompanying drawings.

BRIEF DESCRIPTION OF THE DRAWING

The drawing shows a partial isometric and schematic view of the length sensing single strand shuttle cutter apparatus in a forward cut position.

DESCRIPTION OF THE PREFERRED EMBODIMENTS

Referring now to the drawing, a rectangularly shaped slide housing 10 has a bifurcated front end 12 and a rear end 14. The housing rear end 14 has an air cylinder 16 fixedly attached thereto in such manner that piston rod 18, of air cylinder 16, moves parallel to and in alignment with longitudinally positioned parallel spaced housing slide grooves 20 located in housing side walls 22 and 24. An agate housing bore 26 transversely positioned in housing bifurcate front end 12 fixedly clamps therein an agate or die 28 which is in turn fixedly held in die holder 30. The housing 10 is positioned beneath the die holder 30 so that the extruded strand of propellant (not shown), which comes out of die orifice 32, will pass intermediate and axially in line with a pair of downwardly protruding optical housing length-positioning bosses 34 and 36. Contained within first boss 34 is a solid state light source 38 which is in axial alignment with a light detecting photocell 40 contained in second boss 36. The optical axis of light source 38 and photocell 40 is positioned a fixed distance away from cutting blade 50 which is equal to the length of grain propellant desired. A solid state light source and photocell suitable for this purpose may be obtained from Texas Instrument Inc. of Dallas, Texas 75222, Models TIXL09 and TIXL57 respectively. A rectanglar slab shaped slide cutter holder 42, which slidably rides in grooves 20, has its rear end 44 fixed to piston rod 18. Cutter holder 42 has an open front end 46 which contains a strand-pass-through hole 48 therein, the latter is in axial alignment with die orifice 32. A double edge cutting blade 50 is fixedly positioned across the top of the open ends of parallel slide arm members 54 and 56. Air cylinder 16 has a front inlet port 58 and a rear inlet port 60. A first air line 62 has one end 66 pneumatically connected to front inlet port 58 and its other end 68 pneumatically connected to a first solenoid two-way valve $V_1$. In a similar fashion, a second air line 64 has one end 70 pneumatically connected to rear inlet port 60 and its other end 72 pneumatically connected to second solenoid two-way valve $V_2$. Photocell 40 when deactivated generates an output signal which is electrically coupled by lead 74 to the input of a Schmitt trigger control circuit 76 which has 2 pair of output terminals 78 and 80. The first control circuit output terminal 78 is electrically coupled to the first solenoid valve $V_1$ by conductor 82. In like manner the second control circuit output terminal 80 is electrically coupled to the second solenoid $V_2$ by conductor 84. An air supply line 86 feeds high pressure air to solenoid valves $V_1$ and $V_2$ by branch air lines 88 and 90 respectively.

In operation, when the extrusion extends to the point that the light beam from light source 38 to photocell 40 is broken, the Schmitt trigger control circuit 76 will cause an output signal to be switched from first output terminal 78 to second output terminal 80. Solenoid valve $V_2$ will become energized by conductor 84 while simultaneously solenoid valve $V_1$ will be de-energized. When solenoid valve $V_1$ is de-energized, the two-way valve will close off the passage of high pressure air from branch air line 88 to air line 62 and will open up air line 62 so that it can vent to the atmosphere. When solenoid valve $V_2$ is energized the two way valve will open up for the passage of high pressure air from branch air line 90 to air line 64 and close off air line 64 so that it cannot vent to the atmosphere. This will cause the piston (not shown), in air cylinder 16, to be pushed toward front inlet port 58. This forward movement of the piston, which is attached to piston rod 18, will cause shuttle cutter holder 42 to move toward housing front end 12 and cause the front edge 52 of blade 50 to cut the rear end 53 of extruded strand 55. When the front or lead edge 52 of the extruded propellant crosses the optical axis of the light source 38 and the photocell 40, an input signal is sent to the control circuit 76 causing it to shift so that the second output terminal 80 is de-energized and the first output terminal 78 is energized. In a similar manner as aforedescribed, de-energized second solenoid valve $V_2$ shuts off air line 64 from high pressure branch line 90 and vents air line 64 to the atmosphere. Simultaneously first solenoid valve $V_1$ is now energized through conductor 82 thereby allowing high pressure air to get into air line 62 from branch line 88. The shuttle cutter 42 now moves rearwardly toward housing end 14 and cutter blade rear edge 57 cuts off the extruded propellant. The cycle aforedescribed is repeated when the leading edge of the next following extruded propellant again crosses the optical axis of light source 38 and photocell 40.

The foregoing disclosure and drawings are merely illustrative of the principles of this invention and are not to be interpreted in a limiting sense. I wish it to be understood that I do not desire to be limited to the exact details of construction shown and described for obvious modifications will occur to a person skilled in the art.

Having thus fully described the invention, what is claimed as new and desired to be secured by Letters Patent of the United States is:

1. A length sensing single strand shuttle cutter apparatus for cutting substantially uniform propellant grain lengths from a variable rate continuously extruded propellant mixture which comprises:
    a slide housing having a bifurcated front end, a rear end, side walls having longitudinally positioned parallel spaced slide grooves therein, a pair of downwardly protruding housing length-positioning bosses, and an agate bore positioned in said birfurcated front end intermediate said bosses;
    an agate fixedly positioned in said agate bore, said agate having a die orifice therein which is axially in line with and intermediate said bosses;
    cutter means slidably positioned in said slide grooves for repetitively and uniformly cutting said propellant grain lengths from said extruded propellant mixture;
    optical means for sensing the leading edge of said extruded propellant mixture and generating an output signal in response to the passage of said leading edge in front of said optical means;
    electronic circuit means electrically coupled to and responsive to said optical means for alternately generating output signals to first and second output terminals; and
    pneumatic means for reciprocating said cutter means in said slide grooves in response to said output signals from said electronic circuit means.

2. A length sensing shuttle cutter apparatus as recited in claim 1 wherein said cutter means comprises:
    a rectangular slab shaped cutter holder having a rear end fixed to said pneumatic means and an open front end having two slide arm members integrally connected therewith, said arm members having a strand pass through hole therebetween; and
    a double edge cutting blade fixedly positioned across the top open end of said slide arm members, wherein said cutting blade cuts said extruded propellant mixture into uniform grain lengths each time said pneumatic means responds to said output signals of said circuit means.

3. A length sensing shuttle cutter apparatus as recited in claim 1 wherein said optical means comprises:
    a solid state light source positioned in a first of said pair of length positioning bosses; and
    a photocell positioned in a second of said pair of length positioning bosses, said photocell being axially aligned with light source and having its output electrically connected to the input of said circuit means.

4. A length sensing shuttle cutter apparatus as recited in claim 1 wherein said electronic circuit means comprises a Schmitt trigger control circuit electrically connected to said pneumatic means.

5. A length sensing shuttle cutter apparatus as recited in claim 1 wherein said pneumatic means comprises:
    an air cylinder, fixedly connected to said housing rear end, said cylinder having a piston therein which has a piston rod fixedly connected to the rear end of said cutter holder, said cylinder having a front inlet port and a rear inlet port;
    a first pneumatic line having one end connected to said front inlet port;
    a second pneumatic line having one end connected to said rear inlet port;
    a first two-way solenoid valve having its output pneumatically connected to the second end of said first pneumatic line;
    a second two-way solenoid valve having its output pneumatically connected to the second end of said second pneumatic line;
    an air supply line having first and second branch air lines, said first branch air line pneumatically connected to the input of said first solenoid valve, and said second branch line pneumatically connected to the input of said second solenoid valve; wherein said first and second solenoid valves allow high pressure air to alternately enter into and exit from said first and second pneumatic air lines when said electronic circuit means alternately generates output signals therefrom which are electrically coupled to said first and second solenoid valves.

* * * * *